(12) United States Patent
Tseng

(10) Patent No.: US 9,246,593 B2
(45) Date of Patent: Jan. 26, 2016

(54) OPTICAL COMMUNICATION DEVICE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 280 days.

(21) Appl. No.: 14/035,959

(22) Filed: Sep. 25, 2013

(65) Prior Publication Data

US 2015/0304047 A1 Oct. 22, 2015

(30) Foreign Application Priority Data

Mar. 15, 2013 (TW) .............................. 102109197 A

(51) Int. Cl.
*H04B 10/40* (2013.01)
*H04B 10/25* (2013.01)
*G02B 6/43* (2006.01)
*G02B 6/42* (2006.01)

(52) U.S. Cl.
CPC .............. *H04B 10/40* (2013.01); *G02B 6/4214* (2013.01); *G02B 6/43* (2013.01); *H04B 10/2504* (2013.01)

(58) Field of Classification Search
None
See application file for complete search history.

(56) References Cited

U.S. PATENT DOCUMENTS 6,490,392 B1 * 12/2002 Munekata ............ G02B 6/4214
385/31
7,000,434 B2 * 2/2006 Murali .................. C03C 17/245
385/129

* cited by examiner

*Primary Examiner* — Darren E Wolf
(74) *Attorney, Agent, or Firm* — Novak Druce Connolly Bove + Quigg LLP

(57) ABSTRACT

An optical communication device includes a light emitting element including a light emitting surface, a processor, a first controller electrically connected to the light emitting element and electrically connected to the processor, a light receiving element including a light receiving surface, a storing element, a second controller electrically connected to the light receiving element and electrically connected to the storing element, a first coating element coating the light emitting element, the first controller, the processor, the light receiving element, the second controller, and the storing element, a planar optical waveguide, and two reflecting elements. The first coating element includes a supporting surface. The supporting surface defines two light guiding holes. The planar optical waveguide is positioned on the supporting surface, and defines two through holes. Each through hole spatially corresponds to and communicates with a light guiding hole. Each reflecting element is received in a through hole.

15 Claims, 1 Drawing Sheet

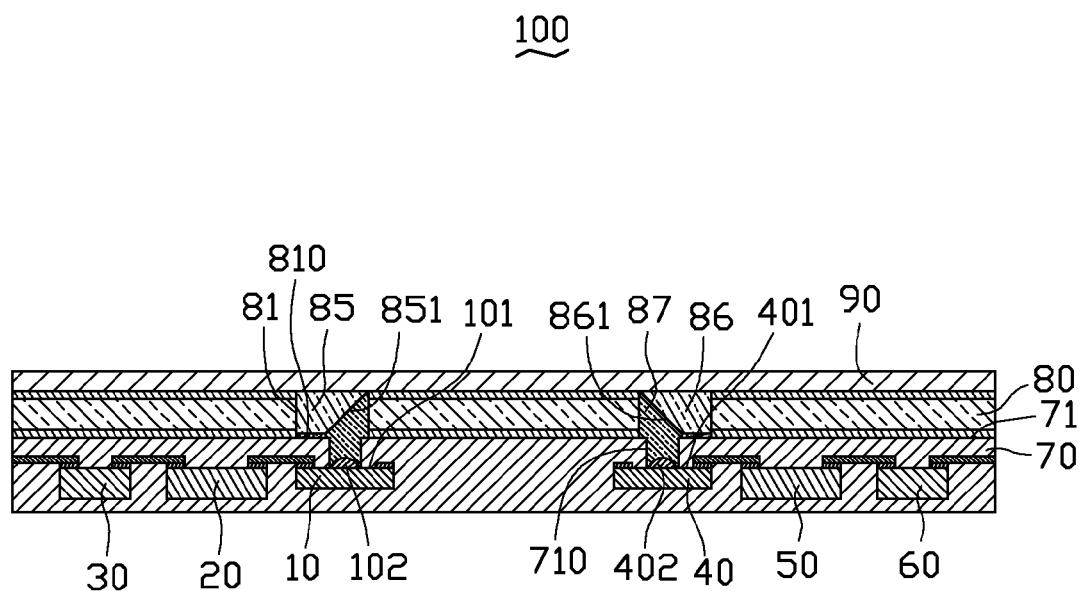

OPTICAL COMMUNICATION DEVICE

BACKGROUND

1. Technical Field

The present disclosure relates to an optical communication device.

2. Description of Related Art

An optical communication device includes a photoelectric element for emitting/receiving optical signals, a driver chip for driving the photoelectric element, a planar light waveguide for transmitting optical signals, and a lens element for optically coupling the photoelectric element with the light waveguide. To ensure an optical transmitting efficiency of the optical communication device, the photoelectric element and the light waveguide need to be accurately aligned with the lens element. However, a complicated alignment mechanism and method is needed to align the photoelectric element and the light waveguide with the lens element, which increases a cost and assembling difficulty of the optical communication device.

Therefore, it is desirable to provide an optical communication device which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a light emitting element 10, a first controller 20, a processor 30, a light receiving element 40, a second controller 50, a storing element 60, a first coating element 70, a planar optical waveguide 80, a first reflecting element 85, a second reflecting element 86, and a second coating element 90.

The light emitting element 10 includes a light emitting surface 101, and a first light condensing lens 102 formed on the light emitting surface 101. In the embodiment, the light emitting element 10 is a laser diode (LD). In the embodiment, the first light condensing lens 102 is a convex lens.

The first controller 20 is located between the light emitting element 10 and the processor 30, and electrically to the light emitting element 10 and to the processor 30.

The light receiving element 40 includes a light receiving surface 401, and a second light condensing lens 402 formed on the light receiving surface 401. In the embodiment, the light receiving element 40 is a photo diode (PD). In the embodiment, the second light condensing lens 402 is also a convex lens.

The second controller 50 is located between the light receiving element 40 and the storing element 60, and electrically connected to the light receiving element 40 and electrically connected to the storing element 60. In the embodiment, the storing element 60 is a flash memory.

The first coating element 70 is made of rubber, the first coating element 70 coats the light emitting element 10, the first controller 20, the processor 30, the light receiving element 40, the second controller 50, and the storing element 60 by an injection molding method. The first coating element 70 includes a supporting surface 71. The supporting surface 71 defines two light guiding holes 710. One of the light guiding holes 710 spatially corresponds to the light emitting element 10, with the first light condensing lens 102 being received in one of the holes 710. The other light guiding hole 710 spatially corresponds to the light receiving element 40, with the second light condensing lens 402 being received in the other light guiding hole 710.

The planar optical waveguide 80 is positioned on the supporting surface 71, and defines two through holes 81. Each through hole 81 spatially corresponds to and communicates with a light guiding hole 710.

The first reflecting element 85 includes a first sloped surface 851 facing the light emitting surface 101. The first reflecting element 85 is positioned in one of the through holes 81 with an adhesive 810, with the first sloped surface 851 aligning with the first light condensing lens 102. In the embodiment, an angle between an optical axis of the first light condensing lens 102 and the first sloped surface 851 is about 45 degrees.

The second reflecting element 86 includes a second sloped surface 861 facing the light receiving surface 401. The second reflecting element 86 is positioned in the other through holes 81 also with the adhesive 810, with the second sloped surface 861 aligning with the second light condensing lens 402. In the embodiment, an angle between an optical axis of the second light condensing lens 402 and the second sloped surface 861 is also about 45 degrees.

The optical communication device 100 also includes two transparent elements 87. One transparent element 87 is filled in one of the light guiding holes 710 and one of the through holes 81. The other transparent element 87 is filled in the other light guiding hole 710 and the other through hole 81. In the embodiment, the transparent elements 87 are made of optical fiber cladding materials.

The second coating element 90 is also made of rubber, the second coating element 90 covers the planar optical waveguide 80, the first reflecting element 85, the second reflecting element 86, and the transparent elements 87 by a injection molding method.

In use, the processor 30 sends a trigger signal to the first controller 20 and the first controller 20 receives the trigger signal and generates a driving signal to drive the light emitting element 10 to emit light beams. The light beams emitted by the light emitting element 10 are condensed by the light condensing lens 102, and are directed onto the first sloped surface 851 through the transparent element 87. The first sloped surface 851 bends the light beams 90 degrees, so that the light beams enter into the planar optical waveguide 80. The light reflects off the second sloped surface 861 and is bent 90 degrees onto the light receiving element 40. The light receiving element 40 converts light signals received by the second light condensing lens 402 into electrical signals, and transmits the electrical signals to the second controller 50. The second controller 50 amplifies the electrical signals. The storing element 60 stores the amplified electrical signals.

In other embodiments, both the first light condensing lens 102 and the second light condensing lens 402 can be omitted if the light is not required to be condensed.

It will be understood that the above particular embodiments are shown and described by way of illustration only. The principles and the features of the present disclosure may be employed in various and numerous embodiment thereof without departing from the scope of the disclosure as claimed.

The above-described embodiments illustrate the possible scope of the disclosure but do not restrict the scope of the disclosure.

What is claimed is:

1. An optical communication device, comprising:
a light emitting element comprising a light emitting surface;
a processor;
a first controller electrically connected to the light emitting element and electrically connected to the processor;
a light receiving element comprising a light receiving surface;
a storing element;
a second controller electrically connected to the light receiving element and electrically connected to the storing element;
a first coating element coating the light emitting element, the first controller, the processor, the light receiving element, the second controller, and the storing element, the first coating element comprising a supporting surface, the supporting surface defining two light guiding holes;
a planar optical waveguide positioned on the supporting surface, and defining two through holes, each through hole spatially corresponding to and communicating with a respective one of the light guiding holes; and
a first reflecting element and a second reflecting element, the first reflecting element received in one of the through holes, the second reflecting element received in the other through hole.

2. The optical communication device of claim 1, wherein the first controller is located between the light emitting element and the processor.

3. The optical communication device of claim 1, wherein the second controller is located between the light receiving element and the storing element.

4. The optical communication device of claim 1, wherein the first coating element is made of rubber, the first coating element coats the light emitting element, the first controller, the processor, the light receiving element, the second controller, and the storing element.

5. The optical communication device of claim 1, comprising two transparent elements, wherein one of the transparent elements is filled in one of the light guiding holes and one of the through holes, the other transparent element is filled in the other light guiding hole and the other through hole.

6. The optical communication device of claim 5, comprising a second coating element, wherein the second coating element is made of rubber, the second coating element covers the planar optical waveguide, the first reflecting element, the second reflecting element, and the transparent elements.

7. The optical communication device of claim 5, wherein the transparent elements are made of optical fiber cladding materials.

8. The optical communication device of claim 1, comprising an adhesive, wherein the first reflecting element is positioned in one of the through holes with the adhesive.

9. The optical communication device of claim 8, wherein the second reflecting element is positioned in the other through hole with the adhesive.

10. The optical communication device of claim 1, wherein the first reflecting element comprises a first sloped surface facing the light emitting surface, the second reflecting element comprises a second sloped surface facing the light receiving surface.

11. The optical communication device of claim 10, wherein the light emitting element comprises a first light condensing lens formed on the light emitting surface, the first sloped surface aligns with the first light condensing lens, the light receiving element comprises a second light condensing lens formed on the light receiving surface, the second sloped surface aligns with the second light condensing lens.

12. The optical communication device of claim 11, wherein an angle between an optical axis of the first light condensing lens and the first sloped surface is about 45 degrees, an angle between an optical axis of the second light condensing lens and the second sloped surface is about 45 degrees.

13. The optical communication device of claim 11, wherein both the first light condensing lens and the second light condensing lens are convex lenses.

14. The optical communication device of claim 1, wherein the light emitting element is a laser diode, the light receiving element is a photo diode.

15. The optical communication device of claim 1, wherein the storing element is a flash memory.

* * * * *